Oct. 8, 1968  F. K. TUCKER  3,404,473

IDENTIFICATION MEANS

Filed May 19, 1966

INVENTOR.
*Frank K Tucker*
BY
*Robert F. Beck*
ATTORNEY

United States Patent Office 3,404,473
Patented Oct. 8, 1968

3,404,473
IDENTIFICATION MEANS
Frank K. Tucker, 628 20th Ave., Paterson, N.J. 07504
Filed May 19, 1966, Ser. No. 551,400
5 Claims. (Cl. 40—129)

ABSTRACT OF THE DISCLOSURE

Identification means for such vehicles as shopping carts wherein a tubular structural member has a lengthwise bore and is formed with spaced openings on a side of the bore, with components in the bore carrying suitable indicia that is exposed through the openings, which components are freely movable along inside the bore and are confined therein.

My invention relates to identification means and more particularly to identification means for vehicles, such as shopping carts or the like.

One of the objects of my invention is to provide identification means for shopping carts or the like whereby the carts may be readily identified as to ownership when lost, misplaced or in possession of unauthorized persons.

Another object of my invention is to provide identification means for shopping carts which is so constructed and arranged that any removal, severance or rupture of the identification means will tend to or result in the shopping cart being rendered useless or inoperative.

A further object of my invention is to provide identification means of the foregoing described character, which is durable and efficient in use, economical in manufacture, simple in construction and may be concealed when viewed from above.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views.

Figure 1:
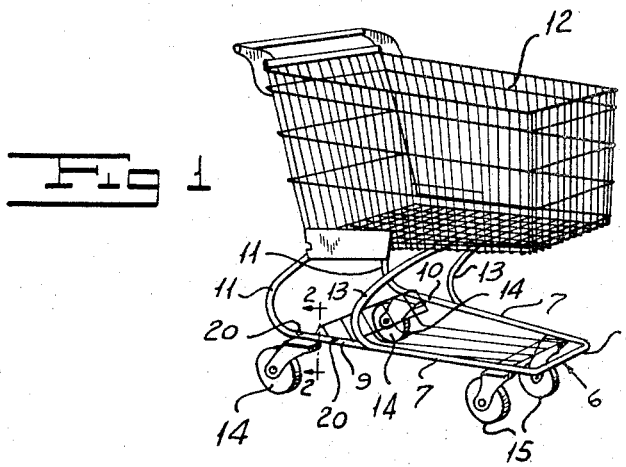
FIGURE 1 is a perspective view of a shopping cart having my invention applied thereto.
Figure 2:
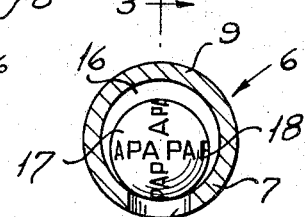
FIGURE 2 is an enlarged transverse sectional view of the lower frame member of the cart taken on the line 2—2 of FIGURE 1.
Figure 3:
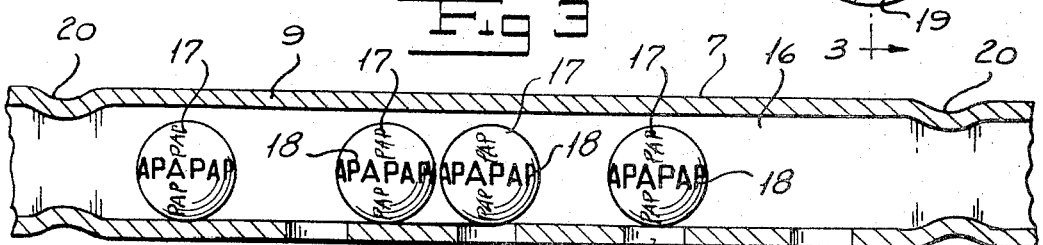
FIGURE 3 is a longitudinal sectional view taken on the plane of the line 3—3 of FIGURE 2.
Figure 4:
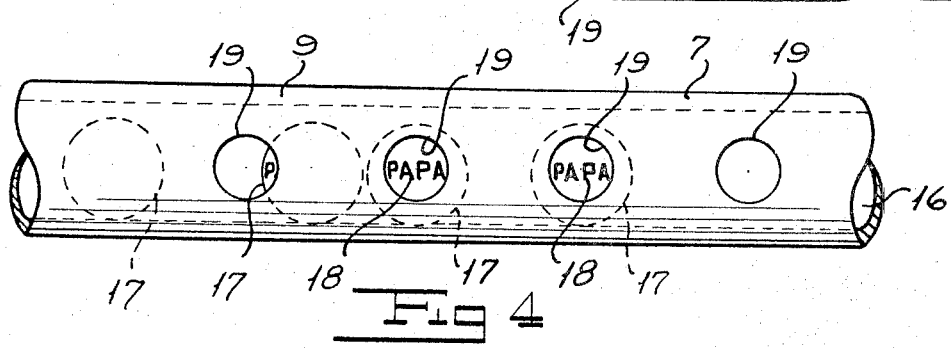
FIGURE 4 is a bottom plan view of that portion of the frame member shown in FIGURE 3.
Figure 5:
FIGURE 5 is a side view of one of the identification components or balls.

As illustrated in FIGURES 1 to 5 inclusive of the drawings, I provide a vehicle, for instance, a shopping cart provided with a structural or lower tubular frame member 6 of a U-shaped construction having side sections 7 and a front section 8 connecting the side sections together. The rear end portions 9 and 10, respectively, of the side sections 7 terminate in upwardly extending sections 11 which support, above the member 6, the usual basket 12.

Spaced forwardly of the portions 9, are upwardly extending auxiliary sections 13 which are connected to the member 6 and the basket for reinforcing and supporting the latter. The rear end portions 9 and 10 of the sections 7 have mounted thereon a pair of rear rollers 14 which cooperate with a pair of front rollers 15 swiveled to the front ends of the sections 7 to permit travel of the cart when in use.

Within the bore 16 of the rear end portion 9 there is contained a number of movable balls 17 provided on their surfaces with indicia 18 denoting the owner of the cart and which can be readily viewed through openings or windows 19 formed in the portion 9, the balls being of a greater diameter than the openings to prevent their discharge, loss or removal from the portion 9 through the openings 19.

In order to confine the balls within the portion 9, which is of a definite and desired length, the section 7 may be diametrically compressed or indented as at 20 to define the length of the portion 9 and thus serve as a means for stopping the balls from rolling throughout the length of the entire frame member. Obviously, any severance or rupture of the portion 9 to remove the balls to prevent identification of the cart would displace or disalign the adjacent roller relative to the other rollers to the extent that the cart would be rendered useless for its usual purpose.

Figure 6:
FIGURE 6 is a side elevation of a modified form of an identification component.

The openings may be formed in the portion 9 on the sides or the bottom thereon and preferably in the latter instance, to conceal the balls from a downward or side view of the frame member. As illustrated in FIGURE 6, a plurality of cylinders 21 having indicia 22 thereon may be employed for identifying the owner of the cart in lieu of the balls 17.

Some of the advantages of my invention are that it provides a permanent identification means which is economical and lends itself to greater security than any other similar means used in connection with shopping carts and that by forming the openings on the bottom of the frame member, it is normally concealed from view. Inasmuch as it would require severance of the frame member or rupture thereof to remove the balls therefrom, it tends to reduce the possibility of the theft of a cart or its removal thereof from its proper or home shopping area. In instances where shopping establishments are closely situated, the carts may be readily identified as to a particular establishment, thus avoiding undue confusion.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims. It is to be understood that the language used herein and in the claims is intended to cover all the generic and specific features of the invention herein described, and all statements of the scope of the invention which, as a matter of language, may be said to fall therebetween.

What is claimed is:

1. Vehicle identification means comprising a structural member of a vehicle having a section provided with a lengthwise bore and formed with spaced openings on one side of said section communicating with said bore, and a plurality of movable components disposed in said bore and provided with indicia viewable through said openings for identifying the vehicle, each of the components having a diameter smaller than the diameter of the bore, but greater than the diameter of the respective openings to move freely through the bore and exposing the indicia through the openings thereof.

2. The structure as set forth and defined in claim 1, wherein said components are balls of a greater diameter than said openings to preclude discharge through said openings and smaller in diameter than the bore.

3. The structure as set forth and defined in claim 2 including said section having a portion of a definite length in which said openings are formed and said balls are confined, means carried by said section defining the length of said portion and effective for confining said balls to said portion.

4. The structure as set forth and defined in claim 1 wherein said components are cylinders of a greater length than the diameter of said openings and smaller in diameter than the diameter of the bore and slidable within the bore to positions for viewing through said openings.

5. The structure as set forth and defined in claim 1, wherein said openings are formed on the underside of said section to preclude viewing of said openings from other than said underside.

References Cited

UNITED STATES PATENTS

| | | | |
|---|---|---|---|
| 143,599 | 10/1873 | Twamly | 273—144.2 |
| 483,138 | 9/1892 | Covington | 40—68 |
| 1,803,694 | 5/1931 | Erickson | 40—68 |
| 2,945,312 | 7/1960 | Book | 40—68 X |
| 2,931,657 | 4/1960 | Lewis | 40—68 X |
| 2,967,714 | 1/1961 | Calabrese | 35—73 |

EUGENE R. CAPOZIO, *Primary Examiner.*

W. J. CONTRERAS, *Examiner.*